3,112,265
PREPARATION OF DISPERSIONS CONTAINING HYDROUS ALUMINUM OXIDE
Ernest C. Yuille, Plainfield, N.J., assignor to American Cyanamid Company, New York, N.Y., a corporation of Maine
No Drawing. Filed Sept. 21, 1960, Ser. No. 57,373
6 Claims. (Cl. 252—8.6)

This invention relates to an improved method for preparing a composition containing aluminum hydroxide or hydrous aluminum oxide, the composition itself, the method of treating surfaces with such a composition to improve their resistance to soiling, and the soil resistant materials which have been so treated.

In the textile field and particularly in the rug industry, where in recent years widespread usage has been made of pastel colors and the number of non-wool rugs, including blends of wool, which tend to soil more readily than wool, has greatly increased, the need for effective soil retardant materials is apparent.

As has been described in the prior art, the function of inorganic soil retardant materials appears to be to fill the imperfections or irregularities in fiber surfaces, making them relatively smooth. In this way, the soil retardant material functions as a soil barrier. For example, according to this theory, once the fibers in the pile portion of a pile fabric such as a pile rug, are saturated with a soil retardant, subsequent impinging soil finds no unoccupied sites. The dirt, therefore, cannot become firmly attached and it is loosely held by the pile or falls to the bottom of the carpet, in which case it is easily removed by vacuuming.

In order for a soil retardant to be commercially acceptable, when applied to the surface to be treated, normally and optimumly to the pile portion of a carpet or rug in effective amounts, it must not appreciably change the color of the rug. Color change in the pile portion of rugs or carpets after being treated with a soil retardant usually refers to a whitening of the colors therein brought about by the fact that soil retardant materials of the inorganic type are invariably white. This color change or whitening effect is a substantial limitation on the use of many materials which otherwise might be acceptable soil retardants.

Another important property of a good soil retardant is that it must not yellow upon drying when properly applied and dried or upon ageing after application.

In addition to a soil retardant not resulting in color change or whitening when employed in effective amounts, a soil retardant should not dust or be readily removed from the fibers treated therewith. In the case of carpets or rugs finished with soil retardant materials which dust excessively, the disadvantages of normal soiling are quickly outweighed.

A further important property of a good soil retardant is that when employed in effective amounts it does not substantially modify the hand of the finished material. The modification of the hand normally produced by soil retardants is the harshening or stiffening of the hand. Soil retardant materials which significantly modify or harshen the hand of pile fabric treated therewith have not been successful.

In addition to the above properties of soil retardant materials, which properties are in particular noted upon the application and drying of these materials on the fabric treated therewith, certain properties, as for example, the stability of formulations containing the soil retardant, the stability of pad baths containing such formulations at effective concentrations and levels of materials as for example 1% solids, and the viscosity of soil retardant dispersions have of recent times become more of an object of investigation since it has been found that in many instances a soil retardant material, while highly effective for soil retardancy, can as a practical matter not be effectively employed by finishers in that the pad baths containing the same are unstable with the result that uniform and even applications of the soil retardant material are difficult if not impossible to effect.

Additionally, some soil retardant dispersions at solids concentrations acceptable for commercialization or shipment thereof are too viscous and of such a nature that attempts to adjust or reduce the viscosity at the finisher's level result in the destruction of the dispersion stability.

Accordingly, it is an object of the present invention to provide a process whereby a stable thixotropic aqueous dispersion of a soil retardant composition is readily prepared in a straightforward and direct manner.

It is a further object of the present invention to provide a stable thixotropic aqueous dispersion of a soil retardant composition containing an aqueous colloidal disperson of aluminum hydroxide which is stable in storage and in application baths.

It is a further object of the present invention to provide a stable thixotropic aqueous dispersion of soil retardant material which when applied in effective amounts on suitable surfaces subject to soiling such as pile fabric, does not yellow on drying or ageing, does not whiten or change the color of the surface applied to, nor modify or harshen the hand of such material when properly treated.

These and other objects and advantages of the present invention will become more apparent from the detailed description thereof set forth hereinbelow.

In accordance with the present invention, a process is provided for preparing a stable thixotropic aqueous dispersion which comprises adding a water-soluble aluminum salt to an aqueous alkaline solution until a pH of between about 3 and 5 is obtained. The resulting disperson is then adjusted to a pH of between 6 and 9 with ammonium hydroxide. The aluminum hydroxide-containing dispersion is dispersed by means of a water-soluble phosphate dispersing agent and the dispersion is milled to provide a final product having a major portion of the particles of 1.0 micron or less in diameter.

By "a stable aqueous dispersion" as that term is applied herein in meant a dispersion which remains essentially homogeneous for periods of time of one year or more at 25° C. By the expression "essentially homogeneous" as that term is employed herein is meant dispersions which remain of uniform consistency. Additionally, "essentially homogeneous" is intended to include dispersions which may have a tendency to settle; which settled material is rapidly and easily redispersed by gentle agitation such as by manually shaking a container containing the same.

It is essential in the present process that the aluminum salt be added to the aqueous alkaline solution if a suitble product is to be obtained. In this regard, it has been our experience that the addition of an aqueous alkaline solution to an aqueous solution of an aluminum salt results in a product which is not stable in conventional application baths and which when settled is virtually impossible to readily redisperse. The addition of the water-soluble aluminum salt to the aqueous alkaline solution is preferably carried out with good agitation in order to achieve the best over-all results. The addition of the aluminum salt is carried out until a pH of between about 3 and 5 is obtained, it having been found that additions which carry the pH significantly below 3 do not improve the product and adversely affect its cost in that more materials and longer times are required for the process.

The adjusting of the dispersion resulting from the addition of the water-soluble aluminum salt to the aqueous alkaline solution to a value of between about 6 and 9 with ammonium hydroxide is a key element of the instant invention with regard to the thixotropic character of the final dispersion. Thus, it has been our experience that ammonium hydroxide is unique in its ability in the present process to confer thixotropy to the composition of this invention. In addition, the use of ammonia at this stage in the present process can be used to adjust the viscosity of the composition of this invention to a preferred range and further results in the production of a composition having what may be termed a mildly acidic or alkaline pH which is most desirable for such compositions where their end use is as soil retardant materials, since alkaline compositions tend to have little, if any, degradative effects upon fibrous materials.

The term "dispersing the precipitate by means of a water-soluble phosphate dispersing agent," as that term is employed in the present specification and claims, refers to the utilization of water-soluble phosphate dispersing agents at various steps or stages in the process of this invention. Thus, the suitable water-soluble phosphate dispersing agents may be present in the reaction medium at the time of the formation of the precipitate through the reaction of the aluminum salt and the alkaline material. Alternatively, the water-soluble phosphate dispersing agents may be employed and added to the composition after the formation of the insoluble precipitate. Preferably, these materials, i.e., the phosphate dispersing agents, are present in the initial water heel and in fact are dissolved therein before the addition of alkali. This procedure is preferred in that after the addition of the aluminum salt and the formation of the precipitate it is somewhat more difficult to solubilize the normal or more common phosphate dispersing agents.

After the formation of the dispersion, the composition is homogenized or milled, as for example, by means of commercial homogenizers such as a Manton-Gaulin homogenizer at 3000 pounds' pressure or by means of a suitable Mikro pulverizer so as to break up aggregates of individuals particles and to reduce coarse particles so that a final dispersion characterized by a major portion of the particles therein being of 1.0 micron and less in diameter. In the present specification the terms milling or homogenizing are employed interchangeably and any procedure whereby an equivalent final product results other than by milling or homogenizing is contemplated.

The water-soluble aluminum salts of the instant invention may be the water-soluble aluminum salts of both inorganic and organic acids. Thus, the water-soluble aluminum salts may be aluminum sulfate, aluminum chloride, aluminum phosphate, aluminum nitrate, aluminum formate, aluminum acetate, aluminum propionate, aluminum butyrate and the like. These water-soluble aluminum salts may be employed singly or in combination with one another and with hydrates of these salts, as for example, the hydrates of aluminum sulfate available as alum, may be advantageously employed. Of the water-soluble aluminum salts, the water-soluble aluminum salts of inorganic acids such as those enumerated hereinabove are greatly preferred and of these the hydrates of aluminum sulfate such as alum or aluminum sulfate sometimes identified as having from between 16 and 18 moles of water of hydration associated therewith, are greatly preferred.

The water-soluble alkalis that may be employed in the present invention are the oxides, hydroxides, carbonates and bicarbonates of the alkali metals sodium, lithium and potassium. While it would be though that ammonium hydroxide would be the equivalent of the alkali metal hydroxides contemplated, as will be seen hereinafter the use of ammonium hydroxide as the sole alkaline material results in a product which is unstable in an application bath. Additionally, the use of an alkali metal hydroxide to adjust the pH from between 3 and 5 to a mildly acidic or alkaline pH instead of amonium hydroxide results in a product which is unstable and separates on standing forming an aqueous layer.

While the water-soluble aluminum salt may in general be added to the aqueous alkali solution until a pH of between about 3 and 5 is obtained, preferably this addition takes place until the pH of the solution is a value of between 3.5 and 4.5 inclusive, it having been found that the best over-all properties of the final dispersion, both with respect to its physical properties as well as its application properties, are achieved when the addition is carried out to this preferred pH range.

The addition of aqueous ammonium hydroxide to adjust the pH within the range of 6 to 9 is preferably carried out so that the pH is adjusted to a value of between 7.0–8.0. Final compositions characterized by a pH within this range also appear to be characterized by the best physical properties, i.e., stability and application properties, i.e., as soil retardant materials.

The dispersion of this invention contains water-soluble phosphate dispersing agents which, as noted above, may be added at virtually any step in the present process, though usually and definitely preferably are present in the composition before the final milling operation. Of the dispersing agents attempted to be employed in the process of this invention, only the phosphate dispersing agents, as for example, the metaphosphates, pyrophosphates, polyphosphates and mixtures thereof have been employed with uniformly good success. Thus, for example, among the suitable soluble phosphate dispersing agents are tetrasodium pyrophosphate, sodium tripolyphosphate ($Na_5P_3O_{10}$), sodium metaphosphate, ammonium metaphosphate, sodium pyrophosphate, sodium polyphosphate ($Na_{12}P_{10}O_{31}$) and the like. The metaphosphates, as in the case of sodium metaphosphate, are preferably written as $(NaPO_3)_x$ and are intended to include the di, tri, tetra, penta and hexa metaphosphates and the like. These compounds and mixtures thereof may be designated as condensed phosphates, which term includes both linear and cyclic metaphosphates. The phosphate salts of other metals such as potassium and the like may be employed where they function as dispersing agents and are water-soluble.

The amount of water-soluble phosphate dispersing agent used must be sufficient to be effective as a dispersing agent, i.e., maintain a major portion of the precipitated particles in a dispersed state. A suitable quantity of phosphate dispersing agent is between 0.5 and 5.0% based on the final weight of the dispersion with between 1 and 2% inclusive being the preferred range.

As indicated above, best results are achieved when the aluminum salt is added slowly to the aqueous solution of the alkali with vigorous stirring of the reaction mixture. It is advantageous to circulate the reaction mixture by means of an external circulating pump and to add the solution of aluminum salt to the circulating charge at a point close to the pump inlet. Suitable agitation, however, may be accomplished by such conventional agitator devices as anchor stirrers, paddle stirrers and the like normally found in conventional plant equipment.

The final step of the process involves the milling of the dispersion so as to break up aggregates and reduce coarse particles so that the final product contains a major portion of particles of 1 micron and less. Milling may be carried out in any of a number of suitable milling and grinding devices. One that has been employed with particular benefit in the process of this invention is a Mikro pulverizer having screens with 0.003 inch diameter holes, although other suitable devices may be employed.

In the preparation of the compositions of this invention, the water-soluble alkali material and the water-soluble aluminum salts are employed in amounts so as to prepare final compositions containing from between about 15 and 30% of dispersed solids. In employing the alkali material, as for example, sodium hydroxide, and the water-soluble aluminum salt, as for example, commercial alum containing 18 moles of water of hydration and ammonium hydroxide, the total charge of alkaline material, i.e., the alkali metal oxides, hydroxides, carbonates, etc., and ammonium hydroxide, on a molar basis with respect to the aluminum salt, will normally be from between 4.0 and 8.0 to 1. Expressed as equivalents, the total number of equivalents of alkaline material charged should be normally from between 5 and 7 to 1 of the water-soluble aluminum salt.

The particle size of the compositions of this invention are such that a major portion of the working particles are less than 1 micron in size and that the ultimate particles of the composition are uniformly less than 1 micron in size. Particle sizes as reported herein are obtained by optical and electron microscopes and examination of various fractions after centrifuging to obtain the fractions.

The compositions of this invention will normally have a viscosity at 25° C. as measured in centipoises by the Brookfield viscometer of between 50 and 700, through preferably a viscosity of between 150 and 400 centipoises at 25° C. Additionally, they are characterized by a specific gravity at 25° C. within the range of 1.1 and 1.3 and preferably within the range of 1.18 and 1.25.

While in some instances the viscosity of the final product at 25° C. may be 700 centipoises or even higher, for example up to 1200 centipoises, these products are difficult to handle. Thus, while for the most part, they are effective as soil retardants they are in general less desirable. It will be noted that products having these less desirable viscosities result from the use of sodium carbonate as the alkali.

Analysis of the products of this invention indicates that, exclusive of phosphate dispersing agents, they contain aluminum hydroxide, which term is intended to include hydrous aluminum oxide, i.e., aluminum oxide containing water of hydration or adsorbed or absorbed water. Additionally, the finished dispersions contain the alkali and ammonium salts of the anions of the aluminum salts employed, or these anions and cations are present in the final composition as their dissociated ions. Thus, compositions containing approximately 15 to 30% solids prepared in accordance with this invention may contain from between about 5 and 10% of aluminum hydroxide and from between about 10 and about 20% of alkali and ammonium salts of the anions of the water-soluble aluminum salt employed in the process of this invention.

In a particular and preferred end use for the compositions of this invention, namely their use as soil retardants, dispersions of these materials may be applied to a suitable base normally subject to soiling by spraying, spraying followed by padding, furnishing rolls, immersion, exhaustion techniques, and the like. Preferably, the dispersion is applied by padding in accordance with procedures well known to those skilled in the textile finishing art.

By "surfaces subject to soiling," as that and similar expressions are employed herein, textile fabrics and in particular pile fabrics are contemplated. The principal examples of pile fabric and the area to which this aspect of the present invention is most closely related insofar as its application aspects are concerned is in carpeting and principally carpeting which is classifiable as being of the pile type. The pile portion of such fabrics may be prepared from natural or synthetic fibers and thus may be composed of cotton, rayon, acetate, wool, the acrylic fibers, polyester fibers, nylon, and the like. Since carpeting made from cotton and rayon seems to have the greater tendency towards soiling, the instant invention is particularly applicable to base materials made of these fibers.

The composition of this invention is applied, as for example, to pile fabric and in particular the pile portion thereof so as to apply from between .25 to 5% based on the weight of the fabric or, in the case of pile fabric, on the weight of pile portion thereof. Preferably, amounts of from between about .5 and 3.0% solids based on the weight of the fabric has been found to be effective with a range of from between .75 and 1.5% solids being preferred for most purposes.

After application the fabric is normally dried, as for example, at temperatures up to 350° F. and more for periods of time sufficient to effect the drying of the material so finished.

In order that the present invention may be more fully understood, the following examples are given primarily by way of illustration. No details or enumerations contained therein should be construed as limiting of the present invention except insofar as they appear in the appended claims. All parts and percentages are by weight unless otherwise specifically designated.

EXAMPLE 1

Into a suitable vessel there was introduced 1,000 parts of water, 90 parts of sodium polyphosphate ("Sodaphos"), 1,860 parts of ice and 1,910 parts of 50% aqueous sodium hydroxide. To this solution there was added with good agitation, 5,700 parts of 54% aqueous aluminum sulfate $[Al_2(SO_4)_3 \cdot 18H_2O]$ at the rate of 1,600 parts per hour. The reaction mixture had a pH of 3.8. Aqueous ammonium hydroxide (315 parts of 28%) was added slowly until the pH was 7.75. The resulting thixotropic dispersion was passed through a Mikro pulverizer using a screen with 0.003 inch diameter holes. The milled dispersion gave the following analytical data:

Viscosity at 25° C. _____ 196 centipoises.
Specific gravity at 25° C. _____ 1.226.
Particle size _____ Major portion less than 1 micron.
Percent total solids [1] _____ 25.7.

[1] Determined by drying a sample at 110° C. for 4 hours.

The total solids of the product of Example 1 had the following analysis:

| | Percent |
|---|---|
| $Na_2SO_4$ | 12.6 |
| $(NH_4)_2SO_4$ | 5.2 |
| $Al(OH)_3$ | 7.1 |
| Sodium polyphosphate | 0.7 |
| Total solids | 25.6 |

EXAMPLE 2

Into a suitable vessel there was introduced 1,000 parts of water, 90 parts of sodium polyphosphate ("Sodaphos"), 1,860 parts of ice and 1,910 parts of 50% aqueous sodium hydroxide. To this solution there was added with good agitation, 4,800 parts of 54% aqueous aluminum sulfate $[Al_2(SO_4)_3 \cdot 18H_2O]$ at the rate of 1,600 parts per hour. The resulting dispersion, which was not thixotropic, was passed through a Mikro pulverizer using a screen with 0.003 inch diameter holes. The milled dispersion gave the following analytical data:

pH _____ 7.2.
Viscosity at 25° C. _____ 11 centipoises.
Specific gravity at 25° C. _____ 1.230.
Particle size _____ Major portion less than 1 micron.
Percent total solids _____ 24.0.

In a similar preparation with pH of 7.7 there was a 5.5% separation of water after the product had stood for a relatively short while.

From Example 2 above, it will be seen that the addition of ammonium hydroxide is essential to the conferring of thixotropy on the compositions of this invention and to confer stability, i.e., freedom from water separation in the said compositions.

EXAMPLE 3

To a solution of 30 parts of sodium polyphosphate ("Sodaphos") and 731 parts of water, there was added 1,059 parts of 30% aqueous sodium hydroxide. When 2,160 parts of 54% aluminum sulfate [$Al_2(SO_4)_3 \cdot 18H_2O$] had been added over 1.5 hours, the pH was 4.4. After adjusting the pH to 5.95 with 75 parts of 28% aqueous ammonium hydroxide, a sample of 1,000 parts was removed from the reaction mixture. Additional amounts of 28% aqueous ammonium hydroxide were then added and samples of 1,000 parts were removed at pH's of 7.1, 8.05 and 9.1, respectively. All the samples were thixotropic and were still homogeneous with no separation of water (after one year).

| Sample | pH | Percent Total Solids |
|---|---|---|
| A | 5.95 | 24.5 |
| B | 7.1 | 24.4 |
| C | 8.05 | 24.2 |
| D | 9.1 | 22.1 |

EXAMPLE 4

To a solution of 30 parts of sodium polyphosphate ("Sodaphos") and 731 parts of water, there was added 1,059 parts of 30% aqueous sodium hydroxide. When 2,160 parts of 54% aluminum sulfate [$Al_2(SO_4)_3 \cdot 18H_2O$] had been added over 1.5 hours, the pH was 3.9. After adjusting the pH to 6.1 with 210 parts of 30% aqueous sodium hydroxide, a sample of 1,000 parts was removed from the reaction mixture. Additional amounts of 30% aqueous sodium hydroxide were then added and samples of 1,000 parts were removed at pH's of 6.9, 7.8 and 9.2, respectively. At pH 4.9, the reaction mixture became thick and was difficult to stir. All of the samples showed water separation, increasing in amount from the first to the last sample.

| Sample | pH | Percent Total Solids | Percent Water Separation |
|---|---|---|---|
| A | 6.1 | 23.9 | 8.7 |
| B | 6.9 | 24.1 | 8.8 |
| C | 7.8 | 23.6 | 12.3 |
| D | 9.2 | 24.0 | 16.6 |

Example 4 demonstrates the uniqueness of ammonium hydroxide insofar as its ability to confer stability to the compositions of this invention, it being noted that in all cases involving the substitution of sodium hydroxide therefor that the final compositions were unstable, as evidenced by the separation of water.

EXAMPLE 5

To 1,200 parts of 20% aqueous sodium carbonate, there was added 1,000 parts of 54% aluminum sulfate [$Al_2(SO_4)_3 \cdot 18H_2O$] over 0.5 hour. The pH of the reaction mixture was raised from 4.9 to 7.1 by adding 46 parts of 28% aqueous ammonium hydroxide. After adding 55 parts of 18% aqueous sodium tripolyphosphate and 20 parts of 50% aqueous sodium hexametaphosphate ("Hexaphos"), the reaction mixture was stirred for 10 minutes. The resulting dispersion gave the following analytical data:

Viscosity at 25° C _____ 700 centipoises.
Specific gravity at 25° C _____ 1.101.
Particle size _____ Major portion less than 1 micron.
Percent total solids _____ 20.8.

A series of similar examples were conducted in which various phosphate dispersing agents, including sodium polyphosphate, mixtures of sodium hexametaphosphate and sodium tripolyphosphate with equally good results being obtained.

EXAMPLE 6

In an attempt to employ ammonium hydroxide as the exclusive alkaline agent whereby aluminum sulfate was added to an aqueous ammonium hydroxide solution until a pH of 7.1 was obtained, the resulting product was unstable particularly in pad baths.

When an attempt was made to continue the addition of aluminum sulfate to a pH of below 7, the reaction mixture became too thick to be handled.

EXAMPLE 7

The products of Examples 1 and 2 were diluted with water to a solids content of 1%. The resulting dispersions were applied to 5" x 5" pieces of white viscose rayon carpet and red wool and rayon carpet by padding, using a 100% wet pick-up. The pieces of carpet were tumbled to allow fluffing of the pile and then were dried at 225° F. for 40 minutes.

The soiling test was carried out by the procedure described in the American Dyestuff Reporter 45, 190 (1956), using a drum-type laboratory soiler and a synthetic soil. The "soiling index" is a measure of the amount of soiling the carpet received in the soiling test and is defined in the following manner:

$$\text{Soiling index} = \frac{\text{apparent soiling of treated carpet}}{\text{apparent soiling of untreated carpet}}$$

and $$\text{Apparent soiling} = \frac{(1-Rs)^2}{2Rs} - \frac{(1-Ru)^2}{2Ru}$$

$Rs$ and $Ru$ are the fractions of light reflected from soiled and unsoiled carpets, respectively. Thus, a soiling index of less than 1.0 indicates that the treated carpet was soiled less than the untreated carpet and a soiling index of more than 1.0 indicates that the treated carpet was soiled more than the untreated carpet.

The hand, dusting and yellowing characteristics of the treated carpet were determined by inspection of the white carpet. Before inspecting for yellowing after heating, the carpet was heated at 350° F. for 10 minutes.

The whitening characteristics of the treated carpet were determined by inspection of the red carpet.

The test results are shown in Table I.

*Table I*

| | Product of Example 1 | Product of Example 2 | Soil Retardant X [1] |
|---|---|---|---|
| Soiling index | 0.57 | 1.35 | 0.54. |
| Hand | Standard | Softer | Similar. |
| Dusting | Very slight | Very slight | None. |
| Yellowing: | | | |
|   Initial | None | None | Do. |
|   10 min. at 350° F | ____do____ | ____do____ | Do. |
| Whitening | Standard | More | Much more. |

[1] Soil Retardant X is a commercially available soil retardant containing principally aluminum phosphate.

I claim:

1. A process for preparing a stable thixotropic aqueous dispersion, comprising adding a water-soluble aluminum salt to an aqueous solution of alkali metal bases until a pH of between about 3 and 5 is obtained, adjusting the pH of the dispersion to between about 6 and 9 with ammonium hydroxide, dispersing the precipitate by means of a water-soluble phosphate dispersing agent, and thereafter milling the dispersion whereby a dispersion is provided, the major portion of particles of which are 1.0 micron and less in diameter.

2. A process according to claim 1 in which the water-soluble aluminum salt is added to the aqueous solution of alkali metal bases until a pH of between 3.5 and 4.5 is achieved and the ammonium hydroxide is added until a pH of between 7 and 8 is achieved.

3. A process according to claim 1 in which the water-soluble phosphate dispersing agent is present during the reaction of the aluminum salt with the alkali metal bases.

4. A process according to claim 1 in which the water-soluble phosphate dispersing agent is selected from the group consisting of metaphosphates, pyrophosphates, and polyphosphates.

5. A process according to claim 1 in which the water-soluble aluminum salt is aluminum sulfate and the alkali metal base is sodium hydroxide.

6. A stable thixotropic composition prepared by reacting a water-soluble aluminum salt with a water-soluble alkali metal base, said composition having a pH of between 6 and about 9 inclusive and a viscosity of between 50 and 700 centipoises at 25° C., a specific gravity of between 1.1 and 1.3, and having a solids content of from between about 15 and 30% consisting essentially of between 5 and 10% of aluminum hydroxide and 10 to 20% of the alkali and ammonium salts of the anion of the water-soluble aluminum salt.

References Cited in the file of this patent
UNITED STATES PATENTS

| | | |
|---|---|---|
| 2,734,834 | Rainard et al. | Feb. 14, 1956 |
| 2,734,835 | Florio et al. | Feb. 14, 1956 |
| 2,909,451 | Lowler et al. | Oct. 20, 1959 |
| 2,987,474 | Wilson et al. | June 6, 1961 |